(12) United States Patent
Gnanasambandam et al.

(10) Patent No.: US 8,790,733 B2
(45) Date of Patent: Jul. 29, 2014

(54) COMPOSITION AND METHODS FOR SOFT BUTTER

(75) Inventors: Ravin Gnanasambandam, Woodbury, MN (US); Arti Bedi, Plymouth, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 242 days.

(21) Appl. No.: 13/049,178

(22) Filed: Mar. 16, 2011

(65) Prior Publication Data

US 2012/0237663 A1 Sep. 20, 2012

(51) Int. Cl.
*A23C 15/02* (2006.01)

(52) U.S. Cl.
USPC ............ 426/581; 426/491; 426/530; 426/586

(58) Field of Classification Search
USPC .................................. 426/581, 530, 491, 586
See application file for complete search history.

(56) References Cited

U.S. PATENT DOCUMENTS

| | | | | |
|---|---|---|---|---|
| 2,010,573 A | * | 8/1935 | Webb ............................ | 426/417 |
| 2,423,834 A | * | 7/1947 | Horneman et al. ........... | 426/417 |
| 3,519,435 A | * | 7/1970 | MacCollom ................... | 426/586 |
| 3,772,447 A | * | 11/1973 | Damerow ...................... | 426/581 |
| 4,438,149 A | * | 3/1984 | Verhagen et al. ............. | 426/603 |
| 4,447,463 A | | 5/1984 | Antenore et al. | |
| 4,769,255 A | * | 9/1988 | Ahmed et al. ................ | 426/603 |
| 4,839,190 A | * | 6/1989 | Bumbalough ................ | 426/603 |
| 5,138,985 A | * | 8/1992 | Szodfridt et al. ........... | 123/90.17 |
| 5,487,913 A | | 1/1996 | Fackrell et al. | |
| 6,083,548 A | * | 7/2000 | Berntsen ........................ | 426/530 |
| 6,468,578 B1 | * | 10/2002 | Bodor et al. .................. | 426/603 |
| 6,916,499 B1 | | 7/2005 | Landon | |
| 7,279,191 B2 | * | 10/2007 | Landon .......................... | 426/581 |
| 7,927,646 B2 | * | 4/2011 | Landon .......................... | 426/581 |
| 8,293,310 B2 | * | 10/2012 | Landon .......................... | 426/581 |
| 8,293,311 B2 | * | 10/2012 | Landon .......................... | 426/581 |
| 8,329,245 B2 | * | 12/2012 | Landon .......................... | 426/664 |
| 2007/0292585 A1 | | 12/2007 | Landon | |
| 2008/0107790 A1 | | 5/2008 | Landon | |
| 2009/0291194 A1 | | 11/2009 | Landon | |
| 2013/0078356 A1 | * | 3/2013 | Mackereth et al. ........... | 426/586 |

FOREIGN PATENT DOCUMENTS

EP 0063389 10/1982

OTHER PUBLICATIONS

Webb, Byron. 1970. Byproducts from Milk, $2^{nd}$ edition. The AVI Publishing Company, Inc. Westport, CT. p. 274-276.*
Fedotove, Y. 2008. JAOCS 85:205.*

* cited by examiner

*Primary Examiner* — Carolyn Paden
(74) *Attorney, Agent, or Firm* — Dorsey & Whitney LLP; Bridget M. Hayden, Esq.

(57) ABSTRACT

The present invention includes a soft butter composition wherein the fat components are derived from cream. The soft butter has a unique fat crystal matrix and is more spreadable due to the altered crystal structure and melting points. The soft butter also equilibrates to room temperature faster than traditional churned butter. The soft butter is made using a process that includes separating the fat and serum components of cream, removing the crystal memory from the fat fraction and recombining fat and aqueous fractions in a process that employs a stepwise cooling and shearing process and filled into tubs of different geometry.

31 Claims, 7 Drawing Sheets

Regular Butter

Soft Butter

40μ

COMPOSITION AND METHODS FOR SOFT BUTTER

FIELD OF THE INVENTION

The present invention relates to a butter product and a method of making the butter product. More particularly, the present invention relates to a butter product that is softer and more spreadable than traditional butter.

BACKGROUND OF THE INVENTION

Butter preparation methods represent some of the oldest techniques for preserving fat components that are found in milk. Butter manufacture has been accomplished in one form or another for over 4500 years. Over the centuries, butter has been used for medicinal and cosmetic purposes, and as a human food.

Butter production techniques generally evolved into more sophisticated techniques as new forms and uses of equipment developed. For example, the barrel churn made its appearance toward the end of the $18^{th}$ century when non-wooden manufacturing materials entered widespread use in creaming and butter-making equipment. These advances led to advances in cream separation techniques and, by 1879, continuous operation cream separators were known in parts of Europe. Likewise, butter production evolved from an individual farm activity to a factory-based technique with the introduction of milk pooling systems for creamery operation in the 1870s. Later advances in fat quantification techniques, pasteurization, refrigeration, and bacterial culture usage further advanced the art of butter production.

Butter is typically a minimum 80% fat, all butterfat, product. Butter is a water-in-oil emulsion made by an inversion process from cream, which is an oil-in-water emulsion. Butter remains a solid when refrigerated, but softens to a spreadable consistency after equilibration to room temperature. A stick of butter, for example, removed from a refrigerator can take about 30 to 45 minutes to equilibrate to room temperature. In fact, consumer practice is to leave the butter out for up to 2-hrs to soften it and use it for various applications. Butter melts to a thin liquid consistency at about 32-35° C. (90-95° F.).

Spreadable butters have been developed using a number of different techniques and compositions. These spreadable butters remain softer at colder temperatures and are therefore easier to use directly from refrigeration. In some cases, the spreadable butters are made by modifying the makeup of the butter's fat composition through chemical manipulation of the finished product. In other cases, vegetable oils are incorporated into the butter to obtain the softer characteristics. These, however, do not always have the desired performance attributes or taste characteristics compared to traditional butter. Butter products are also produced with altered characteristics by manipulating the cattle's feed but this has the drawback of being an expensive undertaking that has limited commercial use. Whipped butter has also been made that is more spreadable and is made through incorporation of nitrogen gas. The use of air for whipping can result in faster oxidation and development of rancidity in the butter.

SUMMARY OF THE INVENTION

In one aspect, the present invention includes a method for producing a butter product. The method includes combining a liquid milkfat fraction and an aqueous fraction to form a butter mixture that is at least about 80 percent by weight milkfat, wherein the butter mixture is at least above 80° F. The method further includes processing the butter mixture by using at least two cooling steps, each cooling step followed by mixing, and a final high shear mixing step to generate a fine, homogenous crystal structure in the butter product.

In another aspect, the present invention includes a method of producing a soft butter product. The method includes separating the fat and serum fractions of cream, removing the crystal memory of the fat fraction by heating, and recombining the fat and serum fractions in a process comprising at least two steps of cooling, each cooling step followed by mixing and a final high shear mixing step to generate a fine, homogenous crystal structure in the butter product.

In a further aspect, the present invention includes a soft butter product comprising at least 80 percent by weight milkfat wherein all of the fat in the butter product is derived from cream. The butter product includes crystals generally about uniform size wherein at least about 75 percent of the crystals are less than about 0.01 microns.

DETAILED DESCRIPTION OF ILLUSTRATIVE EMBODIMENTS

The present invention relates to a fat product, more specifically a soft butter product. The soft butter has altered physical characteristics compared to traditional churned butter. These altered physical characteristics provide a number of advantageous properties relative to traditional butter. The soft butter is a spreadable butter and tempers at a faster rate when held at room temperature than traditional butter. The soft butter product advantageously can have a composition similar and in some embodiments, identical to the composition of traditional churned butter. The altered physical characteristics are generated by processing cream components without churning the cream but using methods that generate a unique fat crystal matrix that is different than the crystal structure of traditional butter. The soft butter product of the present invention can have a structure that is a fine, homogenous crystal microstructure. In contrast, traditional churned butter has a heterogeneous structure that includes globular and non-globular fat and a fat crystal network of varying crystal domain sizes in addition to large and small water droplets.

The method for producing a soft butter product includes generating a heated, concentrated cream that is an oil-in-water (o/w) emulsion. This concentrated o/w cream can be cooled in a manner that inverts the cream to a water-in-oil (w/o) emulsion milkfat mixture. Both the o/w emulsion and the w/o emulsion for example can include at least about 80% by weight milkfat. The w/o milkfat mixture can be heated and separated to form a fat fraction and an aqueous serum fraction. Heating of the fat fraction is typically sufficient to liquefy the fat and remove the crystal structure memory of the fat. The separated fat fraction is at least about 98 percent by weight milkfat. The fat fraction, in a liquid state, can be combined with an aqueous fraction to form a butter mixture that is then cooled. In some embodiments, the fat and aqueous fractions are combined during the cooling. Cooling can be a process using a heat exchanger that, includes multiple cooling and mixing cycles to produce a soft butter product that has a different fat crystal matrix than traditional butter. The butter product is for example at least about 80 percent by weight milkfat and is softer and also softens faster when held at room temperature than traditional butter.

In one embodiment, the same aqueous serum fraction that was removed from concentrated cream by separation is recombined with the fat fraction. Thus, the method of producing the soft butter can be a closed system. By closed system it is meant that none of the fat or serum components are removed from cream nor are any fat or serum components added. The soft butter is made from cream similar to traditional churned butter. Cream is manipulated in methods according to the invention. In a closed system, however, additives which are typically added to traditional butter, such as salt or phospholipids may also be added.

Serum or serum fraction as referred to herein is the aqueous fraction that is produced when cream is processed to separate the fat phase having the milkfat from the aqueous phase. In some embodiments described herein, the serum fraction is used as the aqueous fraction when recombining with the milkfat fraction. In other embodiments, an aqueous fraction is used that has at least one or more components found in serum but may not be entirely derived from cream. All of these embodiments are within the scope of this invention and are described in greater detail below.

The terms "soft butter" or "butter product" referred to herein are used interchangeably and refer to the soft butter product of the invention that is softer than traditional churned butter, for example, at 5° C., due to a unique fat crystal matrix that results from processing the cream using the methods described herein.

In traditional churned butter, the temperature of the milkfat fraction generally does not rise above room temperature, i.e. 72° F. during processing. The crystal structure of traditional butter is determined by the naturally occurring milkfat structure below room temperature. The crystal structure of the traditional butter is also based on cooling the milkfat mixture only from about 72° F. to about 55° F., wherein the final texture of the butter is achieved over several weeks of storage, typically under refrigeration.

In contrast, the soft butter products of the present invention are made using processes in which the milkfat fractions can be heated to above 75° F., preferably above 95° F. and more preferably above 120° F. When the milkfat fractions are heated to the high temperatures, the crystal memory of the milkfats is removed. Furthermore, the mixture with the milkfats is cooled stepwise, as described below, over a larger temperature range to generate butter products that have a fine, homogenous crystal structure. For example, in one embodiment, the butterfat mixture is cooled from about 125° F. to about 40° F. using multiple cooling and mixing steps. The crystal structure of the soft butter products can be attained within hours or a few days, as opposed to several weeks in the traditional churned butter products.

Figure 1:
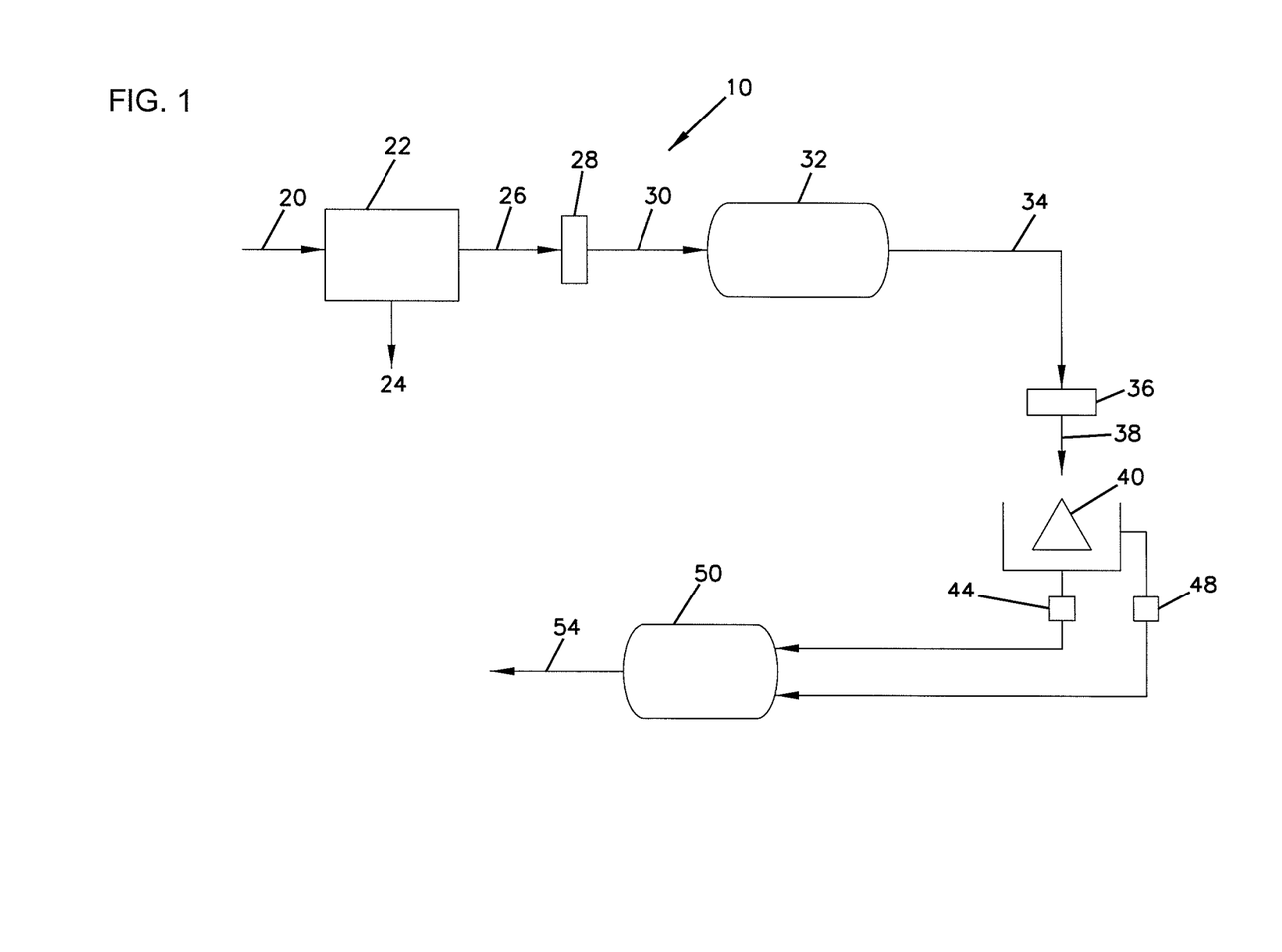
FIG. 1 is a schematic of a process for producing a soft butter product in accordance with the present invention.

The present invention can be practiced by a process depicted schematically in FIG. 1. In process 10, cream 20 that is generally about 40% by weight milkfat is fed into concentrator 22. Concentrator 22 can be, for example, a centrifuge. Cream containing milkfat at different concentrations is also within the scope of this invention. Concentrator 22 separates cream 20 into skim milk 24 and concentrated cream 26. Concentrated cream 26 is for example about 80% by weight milkfat and is an o/w emulsion. Concentrated cream 26 is heated in tank 28 to produce heated, concentrated cream 30 that is subsequently fed into cooler 32. Cooler 32 cools and inverts cream 30 to form milkfat mixture 34 that is a w/o emulsion. Milkfat mixture 34 can include about 80 percent by weight or more of milkfat. Milkfat mixture 34 is heated in tank 36 to form heated milkfat mixture 38 that is separated into different fractions by centrifuge 40. Generally, the milkfat mixture 38 is heated to temperatures to liquefy the mixture 38, preferably above 100° F. In one exemplary embodiment, the mixture 38 is heated to about 135° F. Centrifuge 40 separates the mixture 38 into milkfat fraction 44 and serum fraction 48. Milkfat fraction 44 is for example about at least 98 percent and could be at least about 99 percent by weight milkfat.

Milkfat fraction 44 is then combined with an aqueous fraction. In some embodiments, the aqueous fraction is serum fraction 48 as illustrated in FIG. 1. Milkfat fraction 44 and serum fraction 48 are combined and processed by cooling in cooling unit 50 to form butter product 54. Butter product 54 is a soft butter product that has characteristics described herein. Cooling unit 50 can be, for example, one or more scraped surface heat exchangers (SSHE).

In other embodiments, the aqueous fraction can be a non-serum fraction but has one or more components generally found in serum. Components in the aqueous fraction can include, for example, proteins, lactose, phospholipids, fat, cholesterol, calcium, and other minerals and vitamins. These components may be derived from cream. Alternatively, non-cream derived aqueous components are also within the scope of this invention.

Cooling unit 50 may include multiple components that cool and mix the combined milkfat fraction and aqueous fraction. As the combined milkfat fraction and aqueous fraction are cooled, crystallization can start to occur in the mixture. "Cooling" as referred to herein can include cooling as well as fat crystallizing. The cooling is preferably done in a stepwise process wherein each cooling step is followed by mixing. Thus, the cooling process can include a series of cooling and mixing steps. Preferably, the cooling process includes two or more steps of cooling and mixing. After the final step of cooling and mixing, the composition can be subjected to high shear mixing resulting in a composition that has a fine, homogenous crystal structure.

Figure 2:
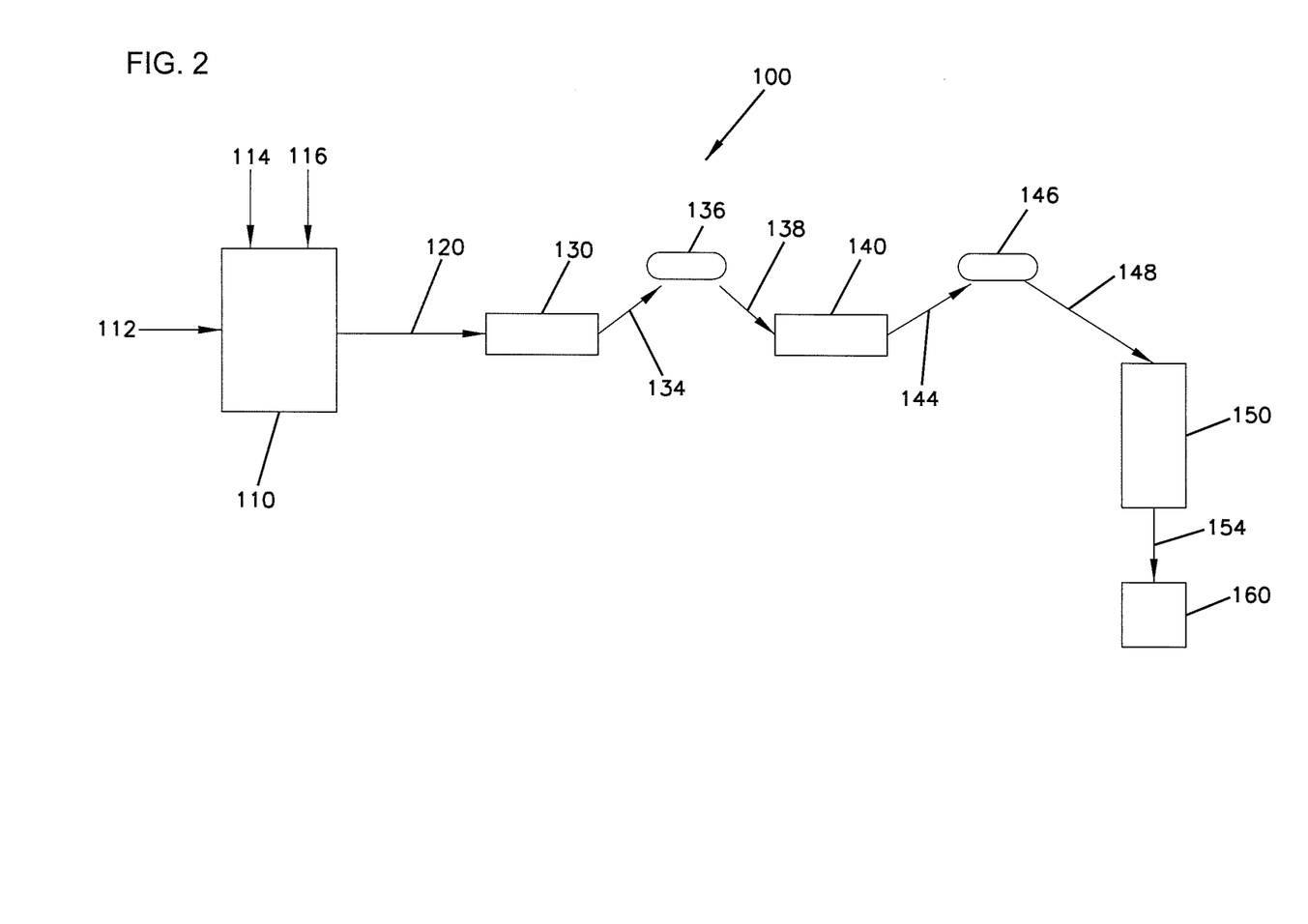
FIG. 2 is a schematic of a process for cooling the butter mixture to form the soft butter.

In one exemplary embodiment, FIG. 2 schematically illustrates cooling process 100. Milkfat portion 112 and aqueous portion 114 can be placed in holding tank 110. Additives 116 may also be optionally included. Additives 116 can include, for example, crystallization modifiers, emulsifiers, lecithin, phospholipids, salts, and/or additional cream or cream components. Crystallization modifiers can be lipid, hydrates of carbon, or proteinaceous in nature. Phospholipids can include various soy lecithins, milk phospholipids and the like. Salts, for example, may be added directly or alternatively, in the form of a brine solution. In alternative embodiments, the milkfat portion 112, aqueous portion 114 and any additives may be directly added to SSHE 130.

When the milkfat portion and the aqueous and/or the serum portions are combined, the butter mixture 120 is formed. In some embodiments, butter mixture 120 includes milkfat at a concentration of at least about 80 percent by weight, conforming to the fat content of regular butter. Concentrations of milkfat lower or higher than about 80 percent are also known and within the scope of this invention.

In cooling process 100, butter mixture 120 is transferred into SSHE 130 in a first step of cooling. The first step of cooling, for example, can cool the butter mixture 120 from about 125° F. to between about 70° F.-50° F. The partially cooled butter mixture 134 is transferred to mixer 136 that mixes at, for example, about 500 RPM. Mixture 138 is transferred to a second step of cooling in SSHE 140 and then transferred to mixer 146. SSHE 140 can, for example, cool the mixture from about 55° F. to about 40° F. and mixer 146 can mix, for example, at about 500 RPM. Cooled butterfat mixture 148 can be mixed in mixer 150 that is a high shear mixer. The product exiting mixer 150 is butter product 154 which is a soft butter. Soft butter 154 can be used to fill tub 160.

The aqueous fraction and the milkfat fraction can be combined together at a temperature where both the milkfat and the aqueous fraction are in a liquid or melted state. Generally, the milkfat and aqueous fractions are above 80° F. Preferably, the milkfat and aqueous fractions are above 100° F. and more preferably, above 120° F. In one exemplary embodiment, the aqueous fraction and the milkfat fraction are at about 135° F.

The process of removal of heat from the butterfat mixture during cooling initiates nucleation and growth of crystals in the butterfat mixture. The first cooling step can generally initiate crystal formation. In some embodiments, the butterfat mixture containing milkfat fraction can be precrystallized prior to first cooling. Precrystallization as referred to herein relates to cooling the milkfat fraction below its melting temperature for example, lower than 105° F., prior to addition of the aqueous fraction. Mixing of aqueous phase with melted milkfat fraction and/or with pre-crystallized milkfat fraction are all within the scope of this invention. Each of these conditions will provide a different crystal structure, however both will produce a soft butter product in accordance with the present invention.

The rate of cooling of the butterfat mixture can be an important parameter in determining the final crystal structure of the soft butter. During or after combining of the milkfat fraction and the aqueous fraction, the mixture is cooled and/or crystallized. The cooling process may include multiple cooling steps as described above. In each step, the cooling can reduce the temperature of the butter mixture by at least about 5° F., preferably by at least about 10° F. and more preferably, by at least about 15° F. The rate of cooling of the butterfat mixture can vary and are all within the scope of the invention. The rate of cooling can also vary in the different cooling steps. In some exemplary embodiments, the rate of cooling is between about 0.25° F./sec to about 1.5° F./sec. In one preferred embodiment, the rate of cooling is about 1° F./sec.

Generally, the butter mixture is mixed with a mixer at about 500 RPM between each of the cooling steps. Mixing at other RPM's is also within the scope of the invention. After the last cooling and mixing step, a high shear mixer can be used to further reduce the crystal size and redistribute the crystals.

Product 154 exiting mixer 150 is of pourable consistency and tub 160 is generally filled at temperatures between about 50° F. and about 65° F. and the product can then be moved to refrigeration. The temperature of the product 154 may be higher than the temperature after the final cooling due to the final high shearing step that can raise the temperature.

The final product texture is achieved as the product undergoes final crystallization during the cooling process upon refrigeration. The final texture is generally achieved by refrigeration for at least about several hours. Typically, the product is refrigerated for at least about 10 hours, or between about 16 to 18 hours in order to attain the final desired texture. The refrigeration time required for final crystallization can also be dependent on the size and the geometry of the tub. In some embodiments, the product can be filled into tubs of varying geometry to alter the time it takes to achieve final texture. This may include different portion sizes ranging from a few grams to 1 or 2 pounds, or filled into bulk packaging such as 50-lb sizes. Steps such as whipping the product with nitrogen or other inert gas, or further texturing of final bulk product and re-portioning it into smaller portions are all within the scope of this invention.

The soft butter products made by the methods described herein have altered physical characteristics from traditional churned butter. The components in the soft butter can be similar to the components in traditional butter. The soft butter product can have at least about 80 percent milkfat. The soft butter product can also have a milkfat concentration greater than 80 percent milkfat. The milkfat in the soft butter is generally derived from cream. Milkfat derived from other dairy sources is also within the scope of the invention.

The crystal structure of the soft butter is generally a fine homogenous structure. The structure can vary but generally at least about 50 percent of the crystals are less than about 0.01 microns. Preferably, at least about 75 percent of the crystals and more preferably, at least about 90 percent of the crystals are less than about 0.01 microns.

The soft butter typically does not include fat components derived from non-dairy sources. Fats from liquid oils such as vegetable oils, or fractionated butter oil and the like are typically not included in the soft butter.

The aqueous components in the soft butter can be derived from a variety of sources. In some embodiments, the aqueous fraction is derived from cream. The aqueous fraction is the serum fraction of the cream that is separated from the milkfat fraction during the soft butter process described herein. In these embodiments, the aqueous components in the soft butter are all derived from cream. In other embodiments, the aqueous fraction can be a non-cream derived or non-serum fraction that has been manipulated to include aqueous components generally found in a serum fraction. For example, the aqueous fraction can be an aqueous solution with added components. In some embodiments, the added components into the aqueous solution are similar in identity and quantity to components in a cream-derived serum fraction.

Additives may be added to the milkfat fraction, the aqueous fraction or the butter mixture after the milkfat fractions and the aqueous fractions are combined. The additives in the soft butter can include, for example, crystallization modifiers such as phospholipids, lecithin, emulsifiers, salts, proteins, carbohydrates, or water. Additional cream, fractions of milk fat or similar dairy components may also be added. Additives can also include colors and other agents to enhance the product look and taste. The concentrations of these additives can vary and are all within the scope of the invention. In some embodiments, salts are included in the butter product. If included, salts in the butter product are at a concentration between about 1% and about 2%.

Figure 3:
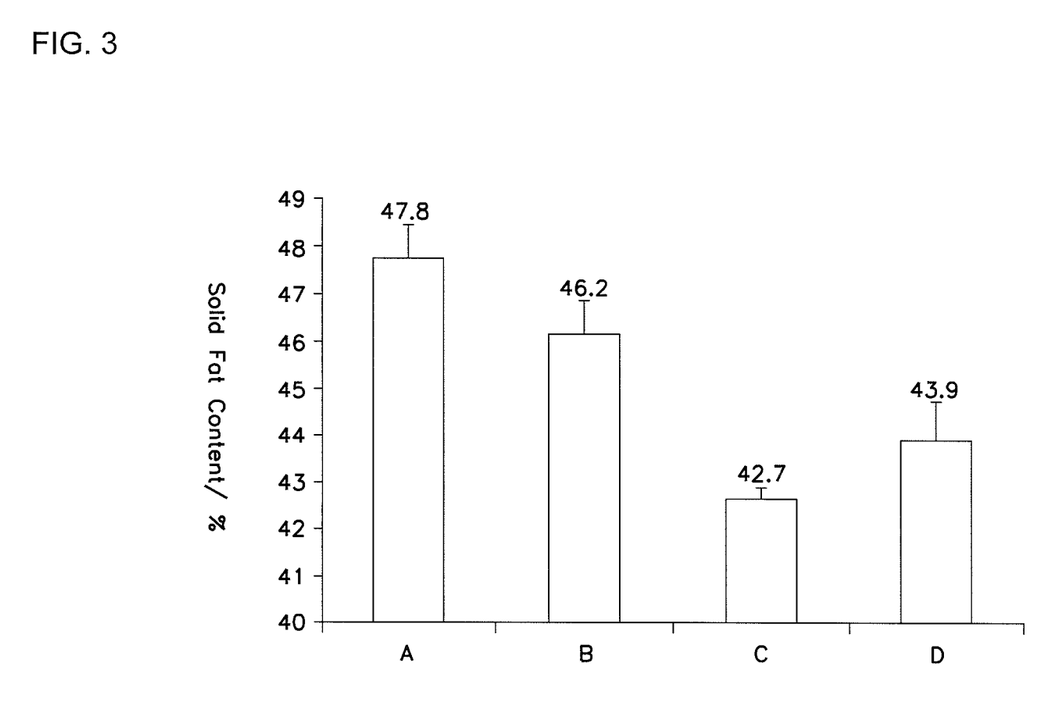
FIG. 3 is a bar graph illustrating the solid fat content of different butters at 5° C.

The solid fat content of the soft butter at 5° C. can vary from the solid fat content of traditional churned butter as shown in FIG. 3. Butter A is a traditional churned butter and Butter C is the soft butter_Butters B and D are soft butters with phospholipid modifiers. The soft butter advantageously includes a greater percentage of the milkfat in a liquid state. The solid fat content of the soft butter at 5° C. is less than that of traditional butter. The lower percentage of solid fat can lead to the softer texture.

The spreadability of the soft butter can be determined using a texture analyzer. Spreadability can be measured, for example, using a TA-XT2i Texture Analyzer purchased from Stable Micro Systems, Surrey, UK., equipped with a commercially available spreadability rig. The spreadability is deter wined by the amount of force necessary to spread the butter for a given distance. The spreadability of the soft butter (Butter B, C and D) was determined by the force necessary to spread the butter about 15 mm, as shown, for example, in FIG. 4. The force needed to spread the butter about 15 mm is generally less than about 400 Newtons. Typically, the force needed to spread the soft butter about 15 mm is less than about 350 Newtons and in some instances less than about 320 Newtons.

The fat in butter is generally composed of multiple fat fractions that have different melting temperatures. The soft butter described herein can have less solid fat fractions because some of the fat fractions are in a liquid state as opposed to a solid state due to polymorphic changes and altered crystal structure. In other words, the soft butter can have less crystalline fat than traditional butter. At lower temperatures, for example, traditional churned butter generally has more solid fat fractions than the soft butter.

Figure 7:
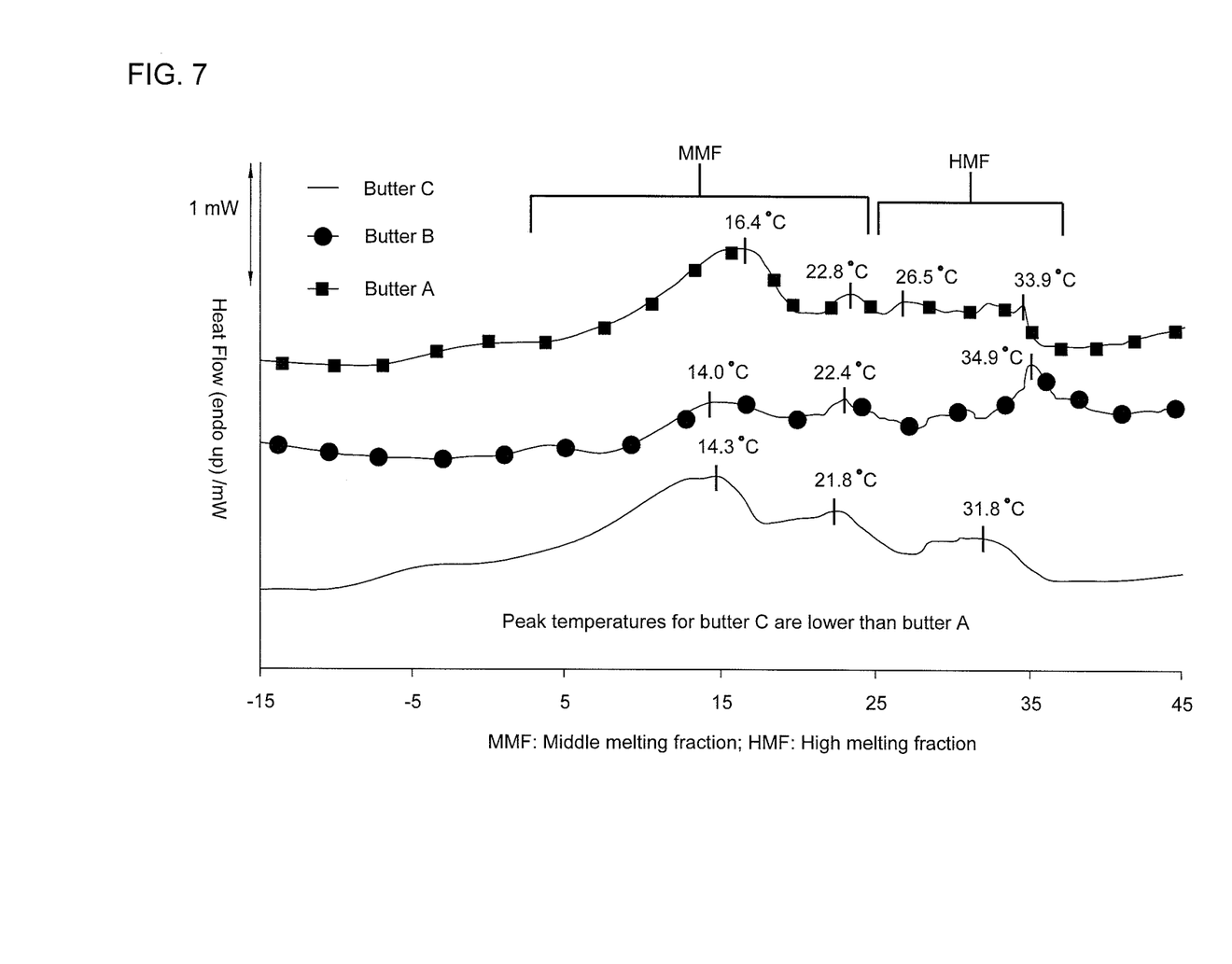
FIG. 7 is a graphical representation of the differences in meltpoints of traditional butter and soft butters.

The soft butter product can have altered melting profiles for the different butterfat fractions. The butter product has decreased melting temperatures and also can use less heat to melt the different butterfat fractions. FIG. 7 illustrates typical differences in melting points of traditional butter vs soft butters. In FIG. 7, soft butter (Butter C) shows trends of lowering peak temperatures than traditional butter (Butter A) indicating an altered structure, thus melting profiles. The milk fat in butter is a mixture of many triglycerides that exhibit significant polymorphic changes due to their heterogeneity of melting behavior. Butter fat shows a melting point range of −40° C. to +40° C. Butter B is another soft butter variable produced at lower mix temperature (90° F.) cooled to 55° F. at the first cooling.

Figure 5:
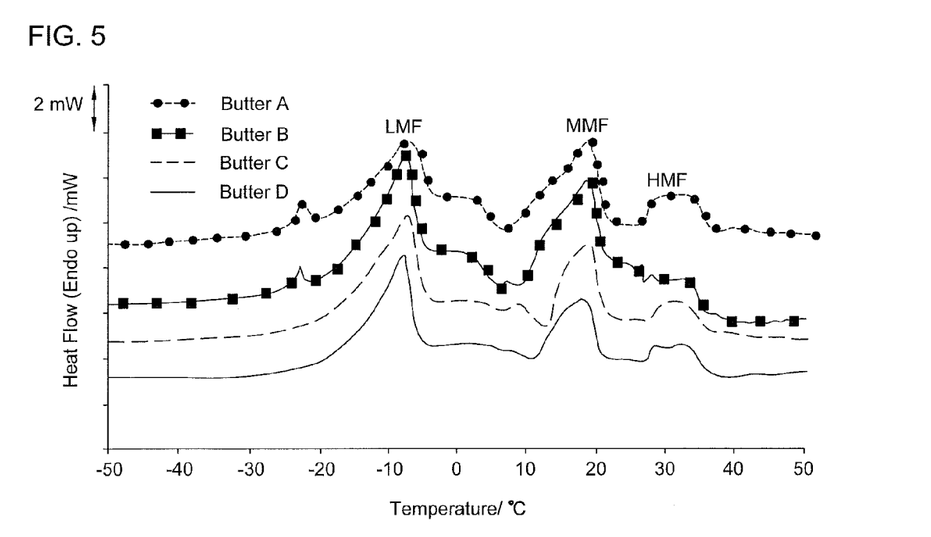
FIG. 5 is a graphical representation of the melting temperatures of the various portions of the butterfat in different butters.

The thermogram shown in FIG. 5 includes that of traditional churned butter (A), and soft butter (B) without additives and soft butter variables (C and D) prepared with phospholipid additives. All thermograms were composed of a low melting fraction (LMF) from −25° C. to +10° C., a middle melting fraction (MMF) from 10° C. to 25° C. and a high melting fraction (HMF) from 25° C. to +35° C. Differences between traditional butter and soft butter can be observed in the region of 25° C. to +35° C., and between 5° C. and 10° C. It can also be seen that soft butter samples show sharper thermal separation than traditional butter. These differences suggest presence of polymorphic subforms that explains the differences in firmness and softening ability observed between butter and soft butter samples.

Figure 6:
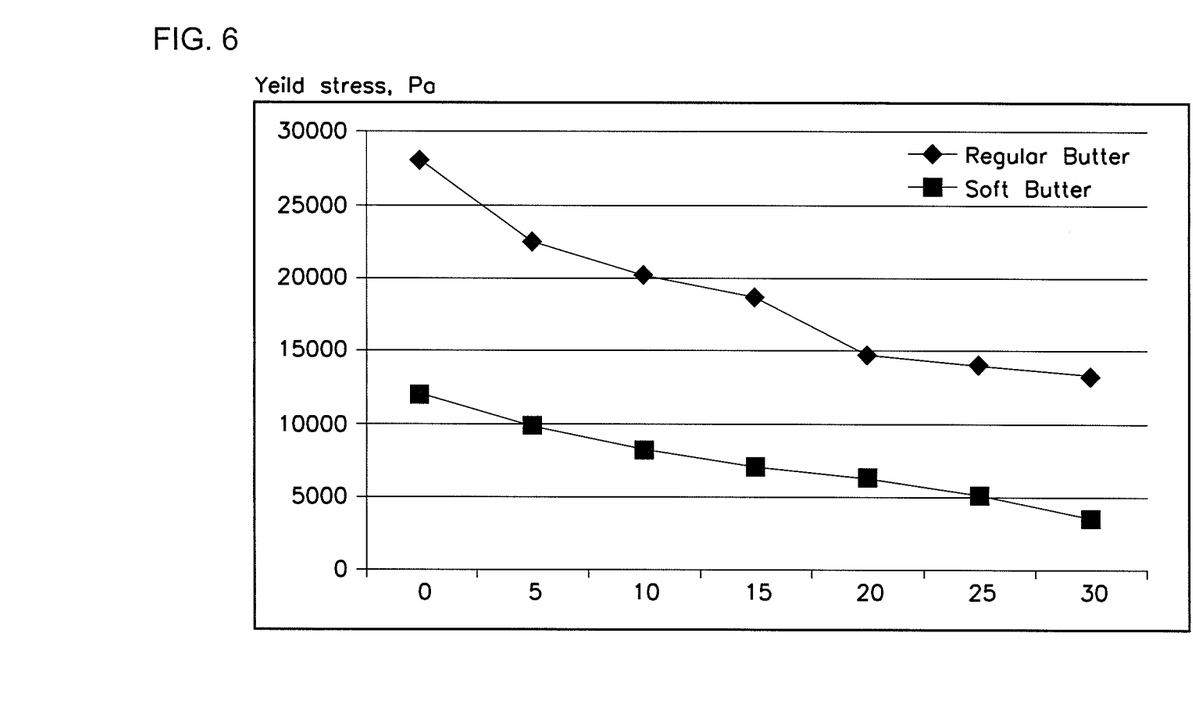
FIG. 6 is a graphical representation of the differences in yield stress (Pa) over a 30 min period for traditional butter and soft butter.

The soft butter of the present invention can temper or soften to room temperature more quickly than traditional butter. When removed from refrigeration, a pound of soft butter in a tub can temper to room temperature in less than about 15 minutes. Typically, a pound of soft butter in a tub can temper to room temperature in less than about 10 minutes. These times may vary depending on the specific geometry of the tub. Tempering times outside of this range are also within the scope of this invention. As shown in FIG. 6, the yield stress of the soft butter at refrigeration temperature is generally less than about 20000 Pa, and can be less than about 15000 Pa. After 30 minutes at room temperature, the yield stress of the soft butter is generally less than about 10000 Pa and could be less than about 5000 Pa.

Figure 8A:
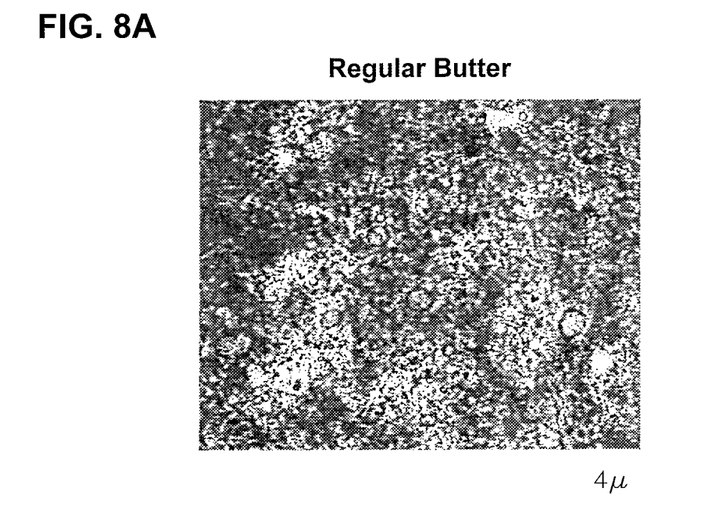
FIGS. 8A and 8B are images from Differential Interference Contrast Microscopy of traditional butter and soft butter, respectively.
Figure 8B:
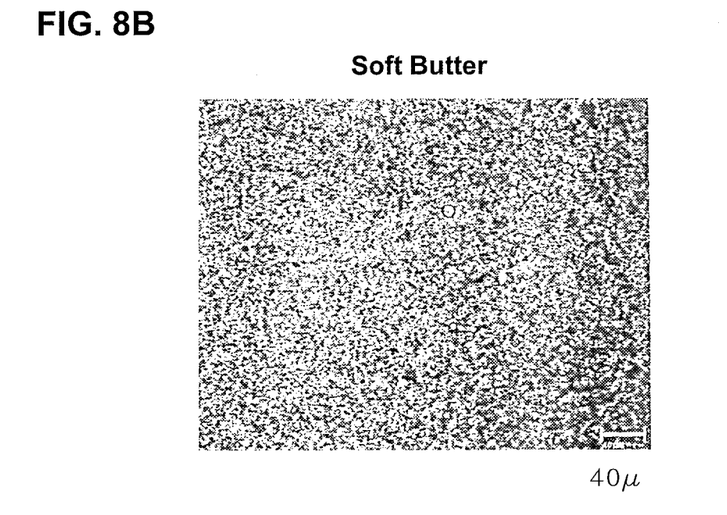

The altered melt behavior of soft butter is also evident by the changes in crystal structure of the soft butter made by the methods described herein. As shown in FIG. 8, using Differential Interference Contrast Microcopy, an image of traditional butter (FIG. 8A) shows a structure typically characterized by a heterogenous matrix of fat globules, crystalline fat, free fat and water droplets of varying size. The crystal size of traditional butter is generally larger than about 0.02 microns and often several times larger due to the churning process and the polymorphic nature of the milkfat. Soft butter shows a fine homogeneous crystal structure (FIG. 8B) with crystal domain sizes at less than about 0.01 microns due to the combination of crystallization and shearing employed in the invention.

EXAMPLE

Cream (about 75 lbs) having about 40% milkfat was heated to about 135° F. and pumped at 10 lbs per minute into an Alfa Laval cream separator at 1000 RPM centrifuge. The skim milk portion was removed after centrifugation and the concentrated cream was pumped into a heated tank that was at about 135° F. to about 140° F. The cream in this tank was about 80 percent by weight milkfat and was an o/w emulsion. The heated o/w emulsion was pumped into a scraped surface heat exchanger (SSHE) such as a Crystallizer unit purchased from Gestenberg and Agger AS, Denmark. The milkfat mixture was converted to a w/o emulsion in the SSHE when it was cooled to between about 50° F.-60° F. The inverted milkfat mixture still had a milkfat concentration about 80 percent by weight. The w/o emulsion was transferred to a tank and heated to about 145° F. After heating, the milkfat mixture was transferred to a centrifuge such as an Alfa Laval cream separator purchased from Alfa Laval, Richmond, Va., run at 1000 RPM to separate the mixture into two fractions, a fat fraction and a serum fraction.

The fat fraction and the serum fraction were pumped into a heated tank and recombined to form a butterfat mixture. The proportions used were adjusted to a minimum of 80% fat in the butter mixture. Additives, soy lecithins and/or milk phospholipids, were used at 0.5 to 1.0%. A temperature controlled heated feed tank was used where the feed temperature was adjusted between about 75° F. and 125° F. Trial runs were performed at temperatures between 75° F. and 125° F., such as 120° F., 110° F., 100° F., 90° F., 75° F.

The butterfat mixture was pumped into a continuous SSHE system that cooled the butterfat mixture to between about 70° F. to 50° F. in the first step of cooling at a cooling rate ranging from 0.5° F./sec to 1.5° F./sec. The first step of cooling was followed by continuous shearing in a pin mixer at 250 to 500 RPM. The mixture was further cooled to 40° F. to 45° F. via second set of SSHE at a rate of cooling from 0.25° F./sec to 1.25° F./sec followed by shearing in a pin mixer at 250 to 500 RPM. The crystallized mixture is pumped through a high shear mixer such as IKA at a frequency setting of 20 Hz to about 30 Hz, or a similar high shear mixer. The product from the high shear mixer was filled into tubs to produce the soft butter product.

Figure 4:
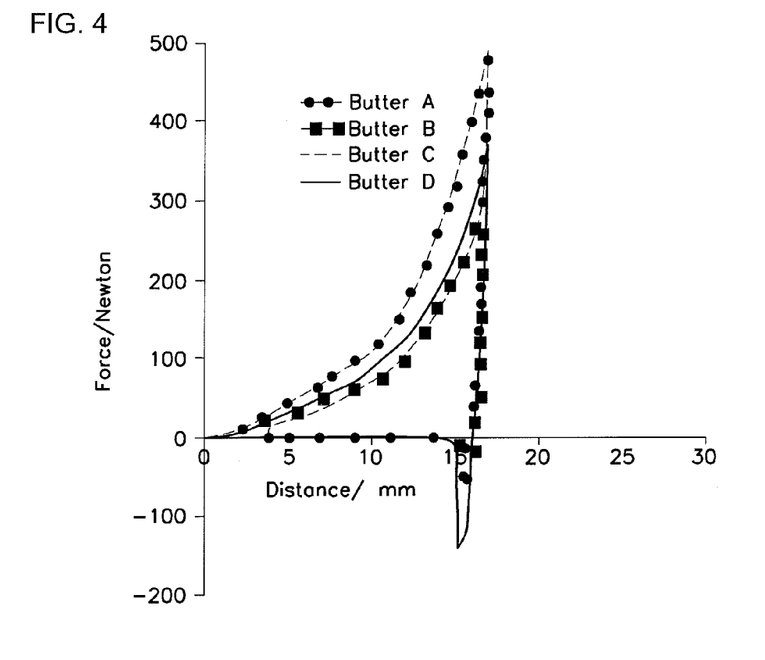
FIG. 4 is a graphical representation of the spreadability of the different butters.

The soft butter product (Butter C) along with traditional churned butter (Butter A), Butter B and Butter D were analyzed. Butter B is another soft butter variable produced at lower mix temperature (90° F.) cooled to 55° F. at the first cooling, and Butter C is a soft butter variable produced at 125° F. tank temperature. FIG. 3 is a typical plot of the solid fat content of various butters including traditional butter and the soft butter described herein. As seen in FIG. 3, Butter C had the lowest solid fat content at 5° C. FIG. 4 showed that the soft butter (Butter C) has increased softness and spreadability than regular churned butter (Butter A).

The thermogram shown in FIG. 5 includes that of traditional churned butter (A), and soft butter variables (B, C, and D) prepared without additional ingredient (B), Butter C with a soy phospholipid additive at 0.60% and D with milk phospholipid at 0.50%. All thermograms were composed of a low melting fraction (LMF) from −25° C. to +10° C., a middle melting fraction (MMF) from 10° C. to 25° C. and a high melting fraction (HMF) from 25° C. to +35° C. Differences between Butter and soft butter were observed in the region of 25° C. to +35° C., and between 5° C. and 10° C. It can also be seen that soft butter samples showed sharper thermal separation than butter. These differences suggested presence of polymorphic subforms that explain the differences in firmness and softening ability observed between butter and soft butter samples.

FIG. 6 illustrates the typical change in texture of soft butter compared to that of regular churned butter. The yield stress of products was measured on a Brookfield Rheometer Model R/S Plus, using ASTM method D 2196 for testing theological properties of non-Newtonian materials. Soft butter shows a significant reduction in yield stress (Pa) over a 30 min period held at room temperature after removal from refrigeration. In FIG. 7, soft butter (Butter C) shows lowered peak temperatures than traditional butter (Butter A) indicating an altered structure, thus melting profiles. As shown in FIGS. 8A and 8B, using Differential Interference Contrast Microcopy, an image of traditional butter shows a crystalline continuous phase made of large heterogenous crystal structure appearing bright (FIG. 8A). Soft butter shows a fine homogenous microstructure (FIG. 8B) due to the combination of crystallization and shearing employed in the invention.

Although the present invention has been described with reference to preferred embodiments, workers skilled in the art will recognize that changes may be made in form and detail without departing from the spirit and scope of the invention.

What is claimed is:

1. A method for producing a water-in-oil butter product comprising:
    separating a milkfat mixture into a milkfat fraction and an aqueous fraction, wherein the milkfat mixture is a water-in-oil emulsion of inverted concentrated cream and is at least about 80 percent by weight milkfat;
    heating the milkfat fraction to form a liquid;
    combining the liquid milkfat fraction and the aqueous fraction from the separated milkfat mixture to form a butter mixture such that the butter mixture includes the same milkfat and aqueous fractions as the concentrated cream and is at least about 80 percent by weight milkfat, wherein the butter mixture is at least above 80° F.; and
    processing the butter mixture by using at least two cooling steps, each cooling step followed by mixing, and a final high shear mixing step to generate a fine, homogenous crystal structure in the butter mixture to form the water-in-oil butter product.

2. The method of claim 1 wherein the milkfat fraction is a water-in-oil emulsion.

3. The method of claim 1 wherein the aqueous fraction is the serum fraction derived from the concentrated cream.

4. The method of claim 1 wherein the heated milkfat fraction is at a temperature between about 125° F. and about 155° F.

5. The method of claim 1 wherein the butter mixture is at a temperature between about 90° F. and about 125° F.

6. The method of claim 1 wherein at least one of the cooling steps is within a heat exchanger.

7. The method of claim 1 wherein at least one of the cooling steps reduces the temperature of the butterfat mixture to between about 70° F. and about 50° F.

8. The method of claim 1 wherein at least one of the cooling steps reduces the temperature of the butterfat mixture to between about 55° F. and about 40° F.

9. The method of claim 1 wherein a rate of cooling for at least one of the cooling steps is between about 0.25° F./second and about 1.5° F./second.

10. The method of claim 1 wherein the combining step further comprises addition of additives.

11. The method of claim 10 wherein the additives are crystallization modifiers comprising emulsifiers, lecithin, phospholipids, salts, additional cream or cream components or combinations thereof.

12. The method of claim 1 wherein the heated milkfat fraction is precrystallized prior to combining with the aqueous fraction.

13. The method of claim 1 wherein inversion to reach the inverted concentrated cream is performed by cooling in a scraped surface heat exchanger.

14. The method of claim 1 wherein the first at least one of the cooling steps is to temperatures between about 70° F. and about 50° F.

15. The method of claim 1 wherein at least one of the cooling steps is to temperatures between about 55° F. and about 40° F.

16. The method of claim 1, wherein heating comprises heating the aqueous fraction with the milkfat fraction.

17. The method of claim 1, wherein the separating, heating, combining and processing steps are in a closed system, and wherein the water-in-oil butter product is produced from the same source of concentrated cream as the milkfat fraction and the aqueous fraction.

18. A method of producing a water-in-oil soft butter product comprising:
    separating the fat and serum fractions of concentrated cream, the concentrated cream having at least about 80 percent by weight milkfat;
    heating the fat fraction;
    recombining the separated fat and serum fractions from the concentrated cream to form a mixture such that the mixture includes the same milkfat and serum content as the concentrated cream and is at least about 80 percent by weight milkfat; and
    processing the mixture using at least two steps of cooling, each cooling step followed by mixing, and a final high shear mixing step to generate a fine, homogenous crystal structure in the water-in-oil butter product.

19. The method of claim 18 wherein the concentrated cream, prior to separation, is a heated, water-in-oil emulsion comprising about 80 percent by weight milkfat.

20. The method of claim 18 wherein a rate of cooling for at least one of the cooling steps is between about 0.25° F./second and about 1.5° F./second.

21. The method of claim 18 wherein additives are also included in the recombining step.

22. The method of claim 21 wherein the additives are crystallization modifiers including lecithin, phospholipids, salts, additional cream or cream components and combinations thereof.

23. The method of claim 18 wherein the fat fraction is precrystallized prior to the recombining step.

24. The method of claim 18 wherein the recombining is performed at a temperature above about 80° F.

25. The method of claim 18, wherein the separating, removing, recombining and processing steps are in a closed system, and wherein the water-in-oil butter product is produced from the same source of concentrated cream as the fat and serum.

26. A water-in-oil soft butter product at room temperature comprising at least 80 percent by weight milkfat and a balance of the butter product containing at least serum, wherein all of the milkfat and the serum in the butter product is derived from concentrated cream with a composition consisting of the at least 80 percent by weight milkfat and the balance serum, the butter product comprising a solid fat content of less than about 43 percent by weight at 5° C. and crystals, wherein at least about 75 percent of the crystals are less than about 0.01 microns.

27. The butter product of claim 26 further comprising additives.

28. The butter product of claim 27 wherein the additives comprise emulsifiers, phospholipids, lecithin, salts, additional cream or cream components or combinations thereof.

29. A water-in-oil soft butter product at room temperature comprising at least 80 percent by weight milkfat and a balance of the butter product containing at least serum, wherein all of the milkfat and the serum in the butter product is derived from concentrated cream with a composition consisting of the at least 80 percent by weight milkfat and the balance serum wherein the butter product comprises crystals with at least about 75 percent of the crystals less than about 0.01 microns, and wherein the butter product is spreadable after about 5 minutes at room temperature when removed from about 4° C.

30. The butter product of claim 29 further comprising additives.

31. The butter product of claim 30 wherein the additives comprise emulsifiers, phospholipids, lecithin, salts, additional cream or cream components or combinations thereof.

* * * * *

UNITED STATES PATENT AND TRADEMARK OFFICE
CERTIFICATE OF CORRECTION

Page 1 of 1

PATENT NO. : 8,790,733 B2
APPLICATION NO. : 13/049178
DATED : July 29, 2014
INVENTOR(S) : Ravin Gnanasambandam et al.

It is certified that error appears in the above-identified patent and that said Letters Patent is hereby corrected as shown below:

SPECIFICATION

| Column | Line | PTO | Should Read |
|---|---|---|---|
| 6 | 66 | "soft butter_Butters B and D" | --soft butter. Butters B and D-- |
| 7 | 10 | "deter wined by the amount" | --determined by the amount-- |
| 9 | 23 | "for testing theological" | --for testing rheological-- |

CLAIMS

| Column | Line | Claim | Line | PTO | Should Read |
|---|---|---|---|---|---|
| 10 | 22 | 14 | 1 | "wherein the first at least one of" | --wherein at least one of-- |
| 11 | 21-22 | 29 | 6-7 | "balance serum wherein the butter product comprises crystals with at least" | --balance serum, wherein the butter product comprises crystals, with at least-- |

Signed and Sealed this
Twenty-fifth Day of November, 2014

Michelle K. Lee
*Deputy Director of the United States Patent and Trademark Office*